Figure 1:
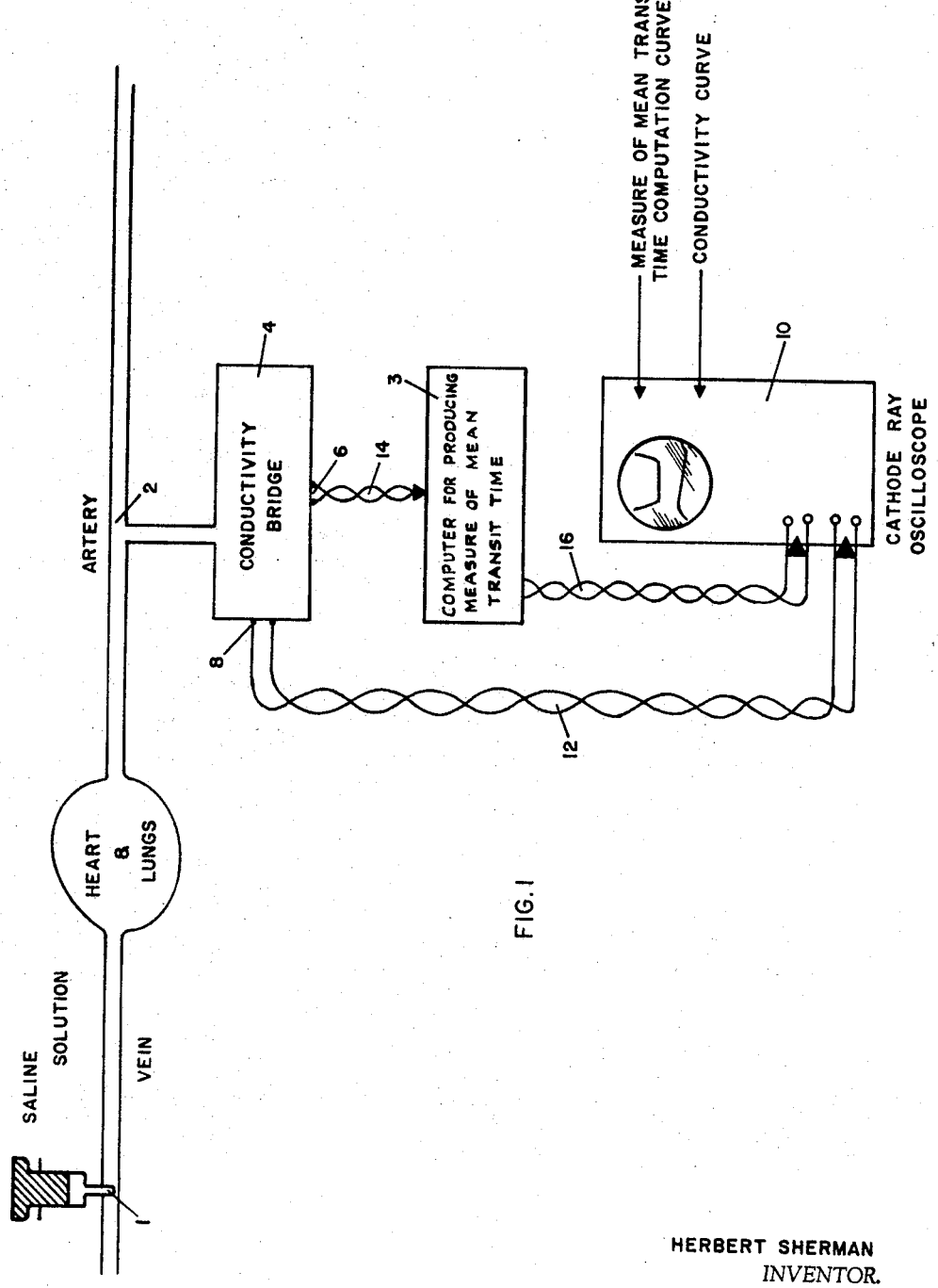

HERBERT SHERMAN
INVENTOR.

BY *Rines and Rines*
ATTORNEYS

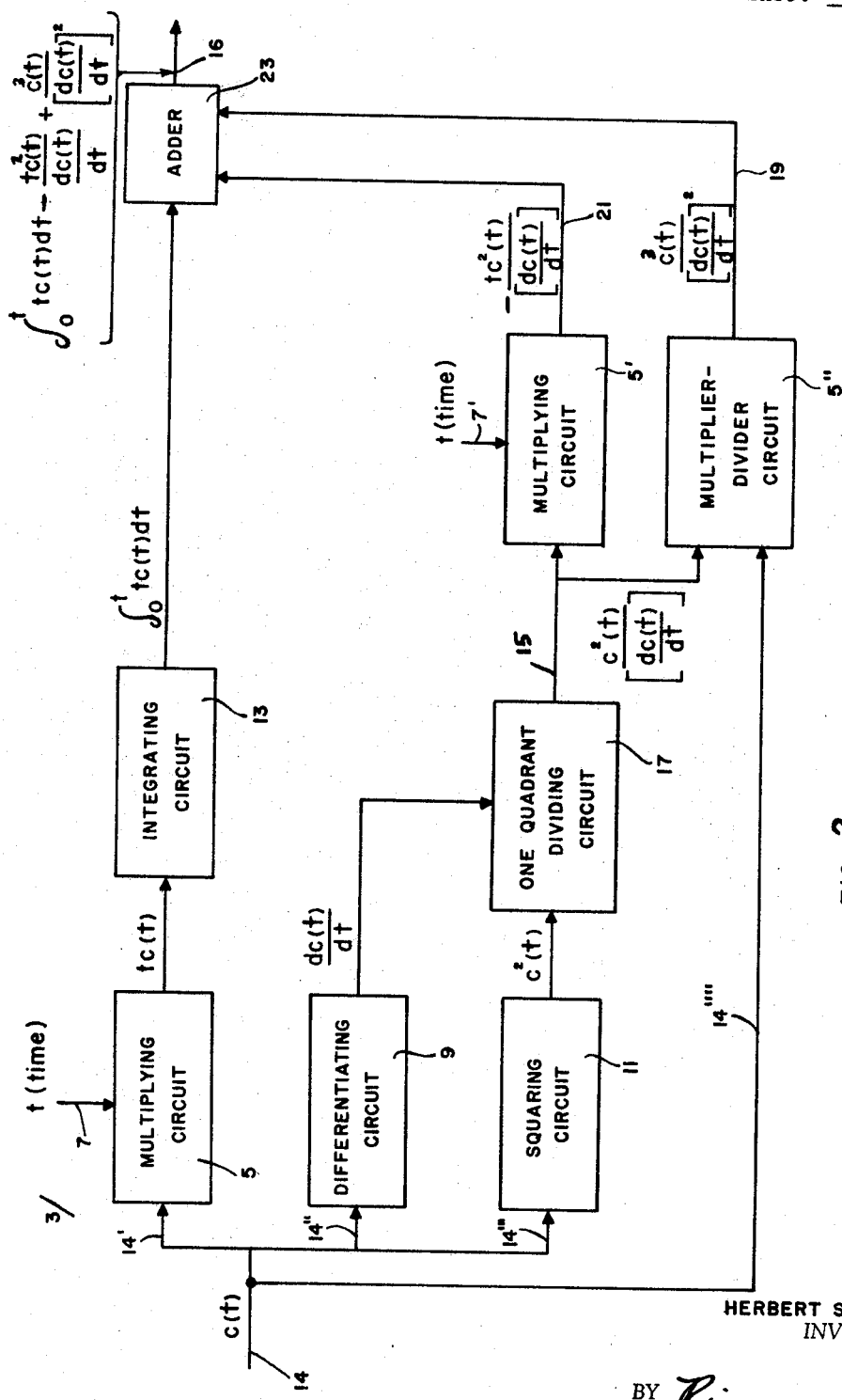

United States Patent Office 3,433,935
Patented Mar. 18, 1969

3,433,935
APPARATUS FOR COMPUTATION PARTICULARLY ADAPTED FOR PRODUCING A MEASURE OF TRANSIT TIME AND THE LIKE
Herbert Sherman, 3 Bates Road,
Lexington, Mass. 02173
Filed July 12, 1963, Ser. No. 294,562
U.S. Cl. 235—183          8 Claims
Int. Cl. G06g 7/18, 7/16, 7/48

The present invention relates to methods of and apparatus for computing the area under time-changing curves; and, more particularly, to computations relating to problems such as the measurement of the mean transit time involved in the flow of a fluid medium through a conduit, as in the case, for example, of blood passing along some portion of the circulatory system.

Considering the application of the invention to the measurement of blood transit time, as an illustrative example, in accordance with present-day practice, substances, such as a dye, or a saline or other solution, are injected into a predetermined point of the circulatory system and the arrival of that substance at another point of the system is monitored. The insertion of a catheter, for example, at the monitoring point in the circulatory system will enable the withdrawal of a sample of blood; or, if a probe-type catheter or the like is employed, a measurement may be effected. By means of such measurements, the so-called concentration curve may be plotted, giving an indication along the ordinate of the concentration of the injected substance in the blood passing the predetermined point at which the measurement is being made, as a function of time, which is measured along the abscissa. This concentration curve may be employed for such purposes as a determination of the fluid flow rate and a measure of the mean transit time between the point of injection and the point of monitoring or sampling, from the latter of which one may determine the volume of fluid between those points. This concentration curve follows the pattern of a relatively steeply rising leading edge which reaches a maximum and then slopes down somewhat exponentially. At some point during the exponential decay or falling edge of the curve, the recirculation of the blood in the circulatory system carries what is left of the injected substance or sample back past the point of monitoring and reproduces a second smaller amplitude curve of the same character.

Since it is desired, as later explained, to obtain a measurement of the area underlying this curve, including only the uninterrupted exponential decay, the presence of such recirculating curves constitutes an artifact that must be ignored. This result is attained, in accordance with present-day practice, by plotting the before-mentioned concentration curve on logarithmic paper so that the exponential decay portion thereof is a substantially straight downwardly sloping line. When that line commences to rise again, the remainder of the curve is ignored and a straight line is extrapolated downwardly. A point-by-point measurement of concentration, multiplied by the time, and summing, will then enable the obtaining of the area underneath the time-weighted concentration curve, as thus extrapolated. That area divided by the area under the concentration curve, without the time multiplication, is a measure of the mean transit time.

The complexity of this operation has heretofore prevented automatic accurate commercial instrumentation, and the obtaining of a computation for a patient has been laborious and time consuming. It has thus been practically impossible, in many cases, for the physician even to have this important bit of diagnostic data available at the time of the examination.

An object of the present invention, accordingly, is to provide a new and improved method of apparatus for automatically, preferably electronically, making the computation of mean transit time and thus obviating the difficulties above discussed.

A further object of the invention is to provide a new and improved computing system that is of more general application, also; being particularly useful in cases where it is desired to compute the area under a time-changing curve (such as a concentration curve), a portion of which unknown as to location in time, follows a predetermined law and has a predetermined characteristic (such as the exponential decay of the falling portion of the curve).

Other and further objects will be explained hereinafter and will be more particularly pointed out in connection with the appended claims.

The invention will now be described with reference to the accompanying drawings FIG. 1 of which is a schematic diagram illustrating the application of the principles of the invention to the illustrative problem of measuring mean transit time; and FIG. 2 is a block diagram of a preferred transit-time computer circuit for utilization in the system of FIG. 1.

Referring to FIG. 1, the invention is illustrated as applied to the injection of a substance, such as a saline solution, into a vein of a patient at 1, and the catheterization of an artery on the other side of the heart and lungs for the purpose of monitoring or measuring the concentration of the saline solution, or other substance, at the catheterization point 2. In the case of the saline solution, the conductivity of the blood is changed so that the catheter at 2 may withdraw a sample of the blood and effect the transducing, in any conventional conductivity bridge 4 (such as, for example, a bridge of the type described on p. 165 et seq. of "Electrical Engineering" by C. L. Dawes, 3rd edition, 1937, McGraw-Hill), of an electric signal at two pairs of output terminals 6 and 8 for utilization in the system. The continuum of instantaneous electric signals is thus available at the output terminals 6 and 8 that is the analog of the before-mentioned conductivity curve.

If, for example, the curve is to be displayed on a recording or indicating device, illustrated as a cathode ray oscilloscope 10, having two sets of deflection means, then the feeding of the continuum of electrical signals at the output terminals 8, by way of conductors 12, to one of the sets of deflection means may produce the rising and exponentially decaying conductivity curve, so labeled at the lower trace on the screen of the oscilloscope 10. Clearly, meters or permanent recorders may also be employed, if desired.

Further in accordance with the invention, the same continuum of electric signals that constitutes the analog of the conductivity curve, is fed from the output terminal 6, by way of conductors 14, to a computer 3 which automatically produces a stable output that can be reliably employed as a measure of the mean transit time. This output is shown applied by the conductors 16 to the other deflection means of the cathode-ray oscilloscope 10, producing the upper trace labeled "measure of mean transit time computation curve." In actual fact the curve so-illustrated, divided by the area under the concentration curve, is the actual mean transit time; but the upper trace does represent a useful measure of that mean transit time, and a comparison of the curves is provided on the indicator 10.

It remains to explain how the computer 3 is constructed in order to obtain this result. Reference is therefore made to FIG. 2 in which the input signal fed along conductors 14 is shown applied at 14″ to a multiplying circuit 5 into which a voltage or other signal, increasing with time, is fed at 7. The multiplying circuit 5 may, for example, be of the type described in the book "Electronic Analog Computers," by Korn and Korn, published by McGraw-Hill in 1952, on page 229. The input signal at 14 is also applied at 14" to a conventional differentiating circuit 9 to produce at the output thereof the derivative of the output signal at 14. Such a differentiating circuit is described, for example, in the aforementioned Korn and Korn text on page 11.

The output of the conductivity bridge 4 that is applied to the input of the computer 3 is also shown applied by conductors 14 and 14‴ to a conventional squaring circuit 11 that may, for example, be of the type described in the said Korn and Korn book on page 229.

At the output of each of the multiplying circuit 5, the differentiating circuit 9, and the squaring circuit 11, there will respectively appear electrical signals corresponding to the following functions:

$$tc(t); \ dc(t)/dt; \text{ and } c^2(t)$$

where $c(t)$ represents the function corresponding to the concentration curve, as a function of time and $tc(t)$ is the time multiple of $c(t)$.

The output of the multiplying circuit 5 is then fed to an integrating circuit 13, such as the type described on page 11 of the Korn and Korn text, in order to produce the integral of the product of time $t$ and $c(t)$ with respect to time, between limits of $o$ to $t$.

The computation process of the invention involves the continual integration of the input signals along the path 5–13 and the continual prediction from the signals of the area under a predicted curve following the predetermined exponential law of the decay portion of the conductivity curve. To obtain the prediction, the output of the differentiating circuit 9 and the output of the squaring circuit 11 are fed to a pair of inputs of a conventional one-quadrant-dividing circuit 17 (as of the type, for example, described on page 229 of the above-mentioned Korn text) that ignores improper polarity in the output of the differentiating circuit 9 and, only in the event that that derivative is negative (in this particular case), permits a division output at conductor 15 corresponding to $c^2(t)$ divided by $dc(t)/dt$.

The output at 15 is fed to a further multiplying circuit 5′ having, again, an increasing signal time input at 7′ in order to produce the multiplication by time of the input at 15. The output at 15 is also fed to a multiplier-divider circuit 5″. The divider circuit 5″ also receives an input from the conductor 14, by way of conductor 14⁗, constituted of the original electrical input signals that, as before stated, are the analog of the concentration curve. The resulting output at 19 produces the cubed numerator $c^3(t)$ and the square term $[dc(t)/dt]^2$ in the denominator.

The outputs of the multiplying circuit 5′ at 21 and of the multiplier divider circuit 5″ at 19 are then fed to an adder 23, producing the ultimate output indicated at 16, which is a measure of the mean transit time of the saline solution or other substance carried by the blood.

In the event that the signals applied at 14 have not yet reached the portion of the conductivity curve following the predetermined exponential decay law, the output at 16 will be unstable since there will be no output from the one-quadrant dividing circuit 17 during the increasing signal applied from the integrating circuit 13. Only when there is an output from the quadrant dividing circuit 17, which can only occur when a signal has been reached that is on the decaying predetermined exponential law portion of the conductivity curve, will the output at 16 stabilize, as shown by the horizontal portion of the upper trace on the oscilloscope 10. At this time the output produced at 16 is an electrical signal corresponding to the area under the then-predicted curve. This area is thus the area that the exponentially decaying portion of the time-multiplied concentration curve would provide in the event that there were no recycling and the exponential decay continued to infinity. The physician thus knows when this has occurred, and the measurement at that time provides a true measure of the mean transit time of the saline or other solution.

Suitable circuits for performing the functions of the multiplying circuit 5′ are described, for example, in the said Korn text on page 229; and suitable multiplier divider circuits 5″ are described on page 229. The adder 23 may, as another illustration, be of the type described on page 11 of this text.

It will be noted that the sum of the outputs at 19 and 21 constitute the area under a time-multiplied predicted curve, following the predetermined exponential law. The output of the integrating circuit 13 is the integral of the time multiple of the electrical signals that are the analog of the concentration curve. Thus, generically speaking, the system of FIG. 2 involves computing the area of a time-changing curve, a portion of which follows a predetermined law (such as the exponential law) that has a predetermined characteristic (such as the falling negative slope characteristic) that comprises the steps of producing electric signals that are the analog of the curve; continually integrating the signals; continually predicting the area corresponding to the area under the predicted curve following the said predetermined law; monitoring the signals until a signal is reached that has the said predetermined characteristic; and thereupon adding to the integrated signals the then-predicted area.

From a more specific point of view, the system of FIG. 2 involves producing the electrical signals that are the analog of the curve; continually integrating the time multiple of those signals; continually predicting from the signals the area corresponding to the area under the time-multiplied predicted curve following the predetermined law (such as the exponential law); the monitoring of the signals until a signal is reached that has the predetermined characteristic (such as the negative scope characteristic of the exponential decay curve); and the addition to the integrated signals of the then-predicted area.

It is, of course, obvious to those skilled in the art that many other types of circuit arrangements may be used to practice the basic method underlying the present invention, and that the same may readily be employed, also, in other transit-time measurements than those associated with the circulatory system, as well as in other applications where the area under curves are desired; all such being considered to fall wtihin the spirit and scope of the invention as defined in the appended claims.

Attention is invited to the fact that if it is desired merely to measure the flow, the predicted area may be directly added to the integrated signals in the output of the integrating circuit 13 by keeping the voltage on conductors 7 and 7′ constant and by disconnecting lead 19.

What is claimed is:

1. Apparatus for computing a measure of the area under a time-changing curve, a portion of which follows a predetermined law and has a predetermined characteristic, that comprises, means for producing a continuum of electrical input signals that are the analog of the curve, integrator means for continually integrating the input signals, means for continually producing from the input signals predicted signals representative of the area under a predicted curve following the said predetermined law, and means for adding the integrated input signals to the predicted area signals.

2. Apparatus as claimed in claim 1 and in which the input signals are time-multiplied before being integrated and in which the predicted area signals are representative of the area under a time-multiplied predicted curve.

3. Apparatus as claimed in claim 2 and in which the said input-signal-producing means comprises means responsive to fluid flow for transducing electrical signals therefrom, and means connected to the output of the adding means for providing a measure of the mean flow transit time.

4. Apparatus as claimed in claim 3 and in which the transducing means comprises a conductivity detector.

5. Apparatus as claimed in claim 2 and in which two channel indicating means is provided connected to both the input-signal-producing means and the adding means.

6. Apparatus as claimed in claim 5 and in which the said indicating means has means providing comparison of the output of the input-signal-producing means representing a fluid-flow characteristic and the output of the adding means representing a measure of the mean flow transit time.

7. Apparatus as claimed in claim 2 and in which the said means for producing predicted-area signals comprises differentiating and squaring means each connected to the input-signal-producing means for respectively differentiating and squaring the said input signals, divider means for dividing the squared signals by the differentiated signals, means for time-multiplying the thus divided signals, further means for multiplying the thus divided signals by themselves and dividing them by the said input signals, and means applying the time-multiplied and further multiplied-divided signals to the adding means together with the said integrated signals.

8. Apparatus as claimed in claim 1 and in which the said means for producing predicted-area signals comprises differentiating and squaring means each connected to the input-signal-producing means for respectively differentiating and squaring the said input signals, and divider means for dividing the squared signals by the differentiated signals to produce the said predicted area signals.

References Cited

UNITED STATES PATENTS

| | | | |
|---|---|---|---|
| 3,049,908 | 8/1962 | Kindred et al. | 235—151.35 |
| 3,157,783 | 11/1964 | Patchell et al. | 235—183 |
| 3,185,820 | 5/1965 | Williams et al. | 235—151.35 |
| 3,230,358 | 1/1966 | Davis et al. | 235—183 |

OTHER REFERENCES

Stern, H.: General Purpose Integrator for Data Reduction, Instruments and Automation, vol. 30, pp. 254–255, February 1957.

MALCOLM A. MORRISON, *Primary Examiner.*

FELIX D. GRUBER, *Assistant Examiner.*

U.S. Cl. X.R.

128—2; 235—151.34, 184, 193, 194